Patented July 26, 1938

2,124,686

UNITED STATES PATENT OFFICE 2,124,686

KETALS

Wallace H. Carothers and Harry B. Dykstra, Wilmington, Del., assignors to E. I. du Pont de Nemours & Company, Wilmington, Del., a corporation of Delaware No Drawing. Application April 24, 1937, Serial No. 138,746

22 Claims. (Cl. 260—151)

This invention relates to new ketals and to methods for their preparation. More particularly it relates to certain trialkoxybutanes and methods for their manufacture.

This application is a continuation-in-part of our copending application Serial No. 31,092, filed July 12, 1935.

It is an object of this invention to prepare new ketals. It is a further object of the invention to prepare 1,3,3-trialkoxybutanes. It is a still further object of the invention to prepare new compounds suitable as intermediates for the preparation of the so-called "oxyprenes", which latter have the general formula $$CH_2=CH(OR)-CH=CH_2$$

where R is a hydrocarbon radical.

The above and other objects appearing hereinafter are accomplished by reacting a four carbon chain ketone of the group consisting of $CH_3COCH=CH_2$ and $CH_3COCH_2CH_2OR$, where R is a hydrocarbon radical with an orthoformate and a monohydric alcohol of the types more fully defined below, and isolating the product. The resulting ketals have the comprehensive formula

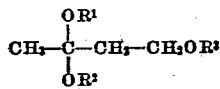

where $R^1$, $R^2$ and $R^3$ are the same or different hydrocarbon radicals.

The ketals with which this invention is concerned may be obtained by one step or by two steps. The specific processes and reactions in the several possible variations of the invention are as follows. In these equations and the subsequent discussion, R is used to represent a hydrocarbon radical, such as alkyl, aryl, aralkyl, or an alicyclic radical.

1. A ketone of the formula $CH_3COCH_2CH_2OR$ may be reacted with the orthoformate, $HC(OR)_3$, and an alcohol, ROH, to form the ketal (ROH is shown on both sides of the equation since the alcohol obtained as a by-product may be different from that used in the reaction):

$CH_3COCH_2CH_2OR+HC(OR)_3+ROH\longrightarrow$
$CH_3C(OR)_2CH_2CH_2OR+HCOOR+ROH$ 2. Methyl vinyl ketone may be reacted first with the alcohol ROH to form a ketone of the formula $CH_3COCH_2CH_2OR$ and the latter compound then reacted with the alkyl orthoformate and additional alcohol, ROH, to form the ketal:

(a) $CH_3COCH=CH_2+ROH\longrightarrow CH_3COCH_2CH_2OR$
(b) $CH_3COCH_2CH_2OR+HC(OR)_3+ROH\longrightarrow$
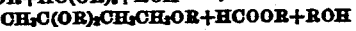$CH_3C(OR)_2CH_2CH_2OR+HCOOR+ROH$ 3. Methyl vinyl ketone may be converted directly into the ketal by reaction with both the orthoformate, $HC(OR)_3$, and the alcohol, ROH;

$CH_3COCH=CH_2+HC(OR)_3+ROH\longrightarrow$
$CH_3C(OR)_2CH_2CH_2OR+HCOOR$

In Method 1, the reaction between the ketone, $CH_3COCH_2CH_2OR$, the orthoformate, $HC(OR)_3$, and the alcohol, ROH, can be effected by mixing these materials and allowing them to remain in contact with each other in the presence of an acid catalyst, such as hydrogen chloride, ammonium chloride, or p-toluene sulfonic acid, until reaction is substantially complete. Good results are obtained by using the ketone $$CH_3COCH_2CH_2OR$$

the orthoformic ester and alcohol in a mol. ratio of approximately 1:1:2, though a greater amount of alcohol, as well as still other proportions, may also be employed. If the R's in the alcohol, ROH, and the orthoformic ester, $HC(OR)_3$, are alike, the R's in the ketal will be alike; if the R's in the alcohol, ketone and orthoformic ester are different, or if the orthoformate is a mixed ester, a mixture of products containing both simple and mixed ketals will result. The reaction of the ketone $CH_3COCH_2CH_2OR$ with the orthoformate and alcohol takes place at room temperature and is generally complete within a few days. Gentle heating increases the rate of the reaction. The ketal may be separated by neutralizing the catalyst and subjecting the mixture to distillation, preferably under reduced pressure. A suitable exact procedure for Method 1 is given in Example I.

While compounds of the type $CH_3COCH_2CH_2OR$ are known per se, yet they may not be available and hence it is often desirable to carry out the two step process of Method 2, starting with methyl vinyl ketone. In this process, methyl vinyl ketone is first treated with an alcohol and the mixture heated. The temperature used may vary from slightly above room temperature to boiling temperature. The time required to obtain a good yield of $CH_3COCH_2CH_2OR$ may be several days, but this may be considerably shortened by refluxing with a catalyst such as cadmium metaphosphate. The ketone $$CH_3COCH_2CH_2OR$$

is obtained by distillation, preferably at reduced pressure. More detailed procedures for reacting alcohols with methyl vinyl ketone can be obtained from U. S. Patent No. 2,010,828. The next step of converting the ketone $CH_3COCH_2CH_2OR$ into the ketal $CH_3C(OR)_2CH_2CH_2OR$ is then carried out as described above. A suitable exact procedure for Method 2 is given in Example II.

The preparation of the ketal $CH_3C(OR)_2CH_2CH_2OR$ directly from methyl vinyl ketone by reacting the latter compound with an orthoformate in the presence of an alcohol is carried out under general reaction conditions similar to those used in carrying out the transformation of the ketone $CH_3COCH_2CH_2OR$ to the ketal $CH_3C(OR)_2CH_2CH_2OR$ This method which is less desirable than Method 1 only for economic reasons, is illustrated in Example III.

The following examples illustrate in more detail the processes described generally above. Parts given are by weight unless otherwise stated. It is obvious that the invention has other forms than these specific examples.

*Example I*

A mixture of 51 parts of β-methoxyethyl methyl ketone $CH_3COCH_2CH_2OCH_3$, 58 parts of methyl orthoformate $HC(OCH_3)_3$, 51 parts of methyl alcohol, and 0.01 part of hydrogen chloride is allowed to stand at room temperature for 19 hours and then heated at 50° C. for 30 minutes. The mixture is cooled, made alkaline with ammonium hydroxide, dried over magnesium sulfate, and distilled. There is obtained about 65 parts of the ketal $CH_3C(OCH_3)_2CH_2CH_2OCH_3$, which represents a yield of 88 percent. This product is described in Table I.

Substitutes for orthoformic esters, such as nascent orthoformic or orthoacetic esters (Ber. 40, 3020 (1907) and orthosilicic esters (Ber. 57, 795 (1924)) may be used in converting the ketone $CH_3COCH_2CH_2OR$ to the ketal $CH_3C(OR)_2CH_2CH_2OR$, but they are in general less satisfactory.

*Example II*

A mixture of 70 parts of methyl vinyl ketone, 56 parts of absolute ethyl alcohol, and 2 parts of cadmium metaphosphate is heated together for three days at from 70° to 80° C. and the mixture then vacuum-distilled. β-Ethoxyethyl methyl ketone $CH_3COCH_2CH_2OCH_2CH_3$, a clear colorless liquid, distills at from 56° to 60° C. at 24 mm. A yield of 86 parts is obtained. This entire amount (86 parts) of β-ethoxyethyl methyl ketone, 117 parts of ethyl orthoformate $HC(OC_2H_5)_3$, 105 parts of ethyl alcohol and 0.05 part of hydrogen chloride is allowed to stand at room temperature for four days. The mixture is made alkaline with ammonium hydroxide, dried over magnesium sulfate, and distilled. There is obtained 130 parts of the ketal $CH_3C(OC_2H_5)_2CH_2CH_2OC_2H_5$, which represents a yield of about 70 percent (computed from the methyl vinyl ketone).

*Example III*

A mixture of 42 parts of methyl vinyl ketone, 209 parts of butyl orthoformate, 137 parts of butyl alcohol, and 0.05 part of hydrogen chloride is allowed to stand at room temperature for one week, and is then heated at 100° C. for 15 minutes. On working up the mixture as in the previous examples, there is obtained 56 parts of the ketal $CH_3C(OC_4H_9)_2CH_2CH_2OC_4H_9$, and 87 parts of an unsaturated ketal or dibutoxybutene which is believed to have the formula $CH_3C(OC_4H_9)_2CH=CH_2$.

*Example IV*

A mixture of 112 parts of β-methoxyethyl methyl ketone, 148 parts of ethyl orthoformate, 95 parts of ethyl alcohol and 0.07 part of hydrogen chloride is maintained at 30° C. for three days. The mixture is then made alkaline with ammonia, dried and distilled under reduced pressure. The chief product is $CH_3C(OC_2H_5)_2CH_2CH_2OCH_3$.

*Example V*

A mixture of 112 parts of β-methoxyethyl methyl ketone, 148 parts of ethyl orthoformate, 142 parts of butyl alcohol, and 0.07 part of hydrogen chloride is kept at room temperature for four days. On working up the reaction mixture as in the preceding experiments, a complex mixture of 1,3,3-trialkoxybutanes is obtained.

The above examples are by way of illustration only. Other alcohols and other orthoformates may be substituted for those of the examples and a large variety of ketals corresponding to the general formula may be obtained. Suitable specific alcohols which may be used include methyl, ethyl, propyl, isopropyl, hexyl, benzyl, and cyclohexyl alcohols. Low molecular weight alcohols (i. e., those having less than 8 carbon atoms) are preferred. Suitable specific orthoformates include propyl, isopropyl, methyl, ethyl, iso-butyl, amyl, phenyl, benzyl, cyclohexyl orthoformates, as well as mixed orthoformates containing any combination of these radicals. It is preferred that the hydrocarbon radicals (i. e., the R's) of the $CH_3COCH_2CH_2OR$ compounds and the orthoformates be of low molecular weight (i. e., less than 8 carbon atoms).

The ketals of the present invention are colorless liquids having a faint ethereal odor. They are reconverted to ketones of the type $CH_3COCH_2CH_2OR$ by hydrolysis in the presence of mineral acids. Physical data for several of the new ketals are given in Table I.

Table I

*Properties of typical compounds of the formula $CH_3C(OR)_2CH_2CH_2OR$*

| Formula | B. P. °C./mm. | $d_4^{20}$ | $n_D^{20}$ | MR Calcd. | MR Found |
|---|---|---|---|---|---|
| $CH_3C(OCH_3)_2CH_2CH_2OCH_3$ | 61–63/20 | .9398 | 1.4112 | 39.45 | 39.15 |
| $CH_3C(OC_2H_5)_2CH_2CH_2OC_2H_5$ | 75/9 | .8940 | 1.4148 | 53.31 | 53.25 |
| $CH_3C(OC_4H_9)_2CH_2CH_2OC_4H_9$ | 120/3 | .8745 | 1.4310 | 81.02 | 81.19 |
| $CH_3C(OC_2H_5)(OC_6H_5)CH_2CH_2OC_6H_5$ | 152/1 | | 1.5210 | | |

The new ketals described herein may be used as softeners for resins and cellulose derivatives. They are useful as intermediates for preparing other compounds. Thus by the action of heat alone or heat and a suitable catalyst, there are obtained, by the elimination of one or two molecules of alcohol, unsaturated dialkoxybutenes of the types $CH_3C(OR)_2CH=CH_2$ and $$CH_3C(OR)=CHCH_2OR$$

and the oxyprenes $CH_2=C(OR)CH=CH_2$. This reaction is a reversible one since the unsaturated compounds reunite with alcohol at temperatures below the dissociation temperatures of the trialkoxybutanes. This may be illustrated in equation form as follows:

$$CH_3C(OR)_2CH_2CH_2OR \underset{+ROH}{\overset{-ROH}{\rightleftarrows}} \begin{array}{c}CH_3C(OR)_2CH=CH_2 \\ \text{or} \\ CH_3C(OR)=CHCH_2OR\end{array} \underset{+ROH}{\overset{-ROH}{\rightleftarrows}} CH_2=C(OR)CH=CH_2$$

This, therefore, furnishes another method of preparing the ketals of this invention, namely, by addition of monohydric alcohols, phenols, and the like to the oxyprenes or dialkoxybutenes. This provides a convenient method for making mixed ketals. For example, the oxyprene $$CH_2=C(OC_2H_5)CH=CH_2$$

adds phenol very readily at ordinary temperatures, yielding the compound $$CH_3C(OC_2H_5)(OC_6H_5)CH_2CH_2OC_6H_5$$

which is described in Table I.

It is apparent that many widely different embodiments of this invention may be made without departing from the spirit and scope thereof and, therefore, it is not intended to be limited except as indicated in the appended claims.

We claim:

1. A process for making ketals which comprises reacting a four carbon chain ketone of the group consisting of $$CH_3COCH=CH_2 \text{ and } CH_3COCH_2CH_2OR$$

with an orthoformate of the formula $HC(OR')_3$ and a hydroxy compound of the formula $R^2OH$, R, R' and $R^2$ being hydrocarbon radicals.

2. A process for making ketals which comprises reacting a four carbon chain ketone of the group consisting of $$CH_3COCH=CH_2 \text{ and } CH_3COCH_2CH_2OR$$

with an orthoformate of the formula $HC(OR')_3$ and a hydroxy compound of the formula $R^2OH$, R, R' and $R^2$ being hydrocarbon radicals of low molecular weight.

3. A process for making 1,3,3-trialkoxybutanes which comprises reacting a four carbon chain ketone of the group consisting of $$CH_3COCH=CH_2 \text{ and } CH_3COCH_2CH_2OR$$

with an orthoformate of the formula $HC(OR')_3$ and a hydroxy compound of the formula $R^2OH$, R, R' and $R^2$ being alkyl radicals.

4. A process for making 1,3,3-trialkoxybutanes which comprises reacting, in the presence of an acid catalyst, a four carbon chain ketone of the group consisting of methyl vinyl ketone and β-alkoxyethyl methyl ketone with an orthoformate of the formula $HC(OR)_3$ and a monohydric alcohol of the formula R'OH, R and R' being alkyl radicals.

5. A process for making 1,3,3-trialkoxybutanes which comprises reacting, in the presence of an acid catalyst, a four carbon chain ketone of the group consisting of methyl vinyl ketone and β-alkoxyethyl methyl ketone, with an orthoformate of the formula $HC(OR)_3$ and a monohydric alcohol of the formula R'OH, R and R' being alkyl radicals, the molecular ratio of ketone to orthoformate to alcohol being about 1 to 1 to at least 2.

6. A process for making 1,3,3-trialkoxybutanes which comprises reacting methyl vinyl ketone with an orthoformate of the formula $HC(OR)_3$ and a monohydric alcohol of the formula R'OH, R and R' being alkyl radicals.

7. A process for making 1,3,3-trialkoxybutanes which comprises reacting, in the presence of an acid catalyst, methyl vinyl ketone with an orthoformate of the formula $HC(OR)_3$ and a monohydric alcohol of the formula R'OH, R and R' being alkyl radicals of low molecular weight, the molecular ratio of ketone to orthoformate to alcohol being 1 to 1 to at least 2.

8. A process for making 1,3,3-trialkoxybutanes which comprises reacting methyl vinyl ketone with a monohydric alcohol of the formula ROH, separating the reaction product and reacting said product with an alkyl orthoformate of the formula $HC(OR')_3$ and a monohydric alcohol of the formula $R^2OH$, R, R' and $R^2$ being alkyl radicals.

9. A process for making 1,3,3-trialkoxybutanes which comprises reacting methyl vinyl ketone with a monohydric alcohol of the formula ROH, separating the reaction product and reacting, in the presence of an acid catalyst, said product with an alkyl orthoformate of the formula $HC(OR')_3$ and a monohydric alcohol of the formula $O^2OH$, R, R' and $R^2$ being alkyl radicals of low molecular weight.

10. A process for making 1,3,3-trialkoxybutanes which comprises reacting a β-alkoxyethyl methyl ketone with an orthoformate of the formula $HC(OR)_3$ and a monohydric alcohol of the formula R' OH, R and R' being alkyl radicals.

11. A process for making 1,3,3-trialkoxybutanes which comprises reacting, in the presence of an acid catalyst, a β-alkoxyethyl methyl ketone with an orthoformate of the formula $HC(OR)_3$ and a monohydric alcohol of the formula R'OH, R and R' being alkyl radicals of low molecular weight.

12. A process for making 1,3,3-trialkoxybutanes which comprises reacting, in the presence of an acid catalyst, a β-alkoxyethyl methyl ketone with an orthoformate of the formula $HC(OR)_3$ and a monohydric alcohol of the formula R'OH, R and R' being alkyl radicals of low molecular weight, the molecular ratio of ketone to orthoformate to alcohol being 1 to 1 to at least 2.

13. A ketal of the formula $$CH_3-\underset{\underset{OR^3}{|}}{\overset{\overset{OR^1}{|}}{C}}-CH_2-CH_2-OR^2$$

where $R^1$, $R^2$ and $R^3$ are hydrocarbon radicals.

14. A ketal of the formula $$CH_3-\underset{\underset{OR^3}{|}}{\overset{\overset{OR^1}{|}}{C}}-CH_2-CH_2-OR^2$$

where $R^1$, $R^2$ and $R^3$ are hydrocarbon radicals of low molecular weight.

15. A 1,3,3-trialkoxybutane.

16. A 1,3,3-trialkoxybutane in which the alkyl radicals of the alkoxy groups are the same.

17. A 1,3,3-trialkoxybutane in which at least two of the alkyl radicals of the alkoxy groups are different.

18. A 1,3,3-trialkoxybutane in which the alkyl radicals of the alkoxy groups are all of low molecular weight and are all the same.

19. A 1,3,3-trialkoxybutane in which the alkyl radicals of the alkoxy groups are all of low molecular weight and in which at least two of the said alkyl radicals are different.

20. A ketal of the formula $$CH_3C(OCH_3)_2CH_2CH_2OCH_3.$$

21. A ketal of the formula $$CH_3C(OC_2H_5)_2CH_2CH_2OC_2H_5.$$

22. A ketal of the formula $$CH_3C(OC_2H_5)(OC_6H_5)CH_2CH_2OC_6H_5.$$

WALLACE H. CAROTHERS.
HARRY B. DYKSTRA.